Aug. 28, 1928.  
J. W. BRUNDAGE  
1,681,973  
METHOD AND APPARATUS FOR VULCANIZING PNEUMATIC TIRES  
Filed July 25, 1927
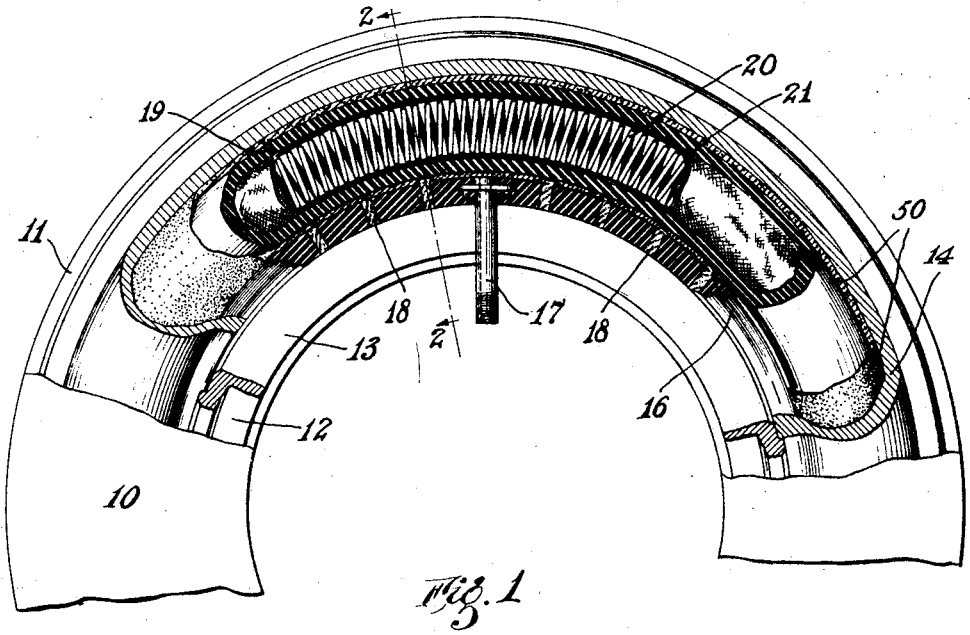
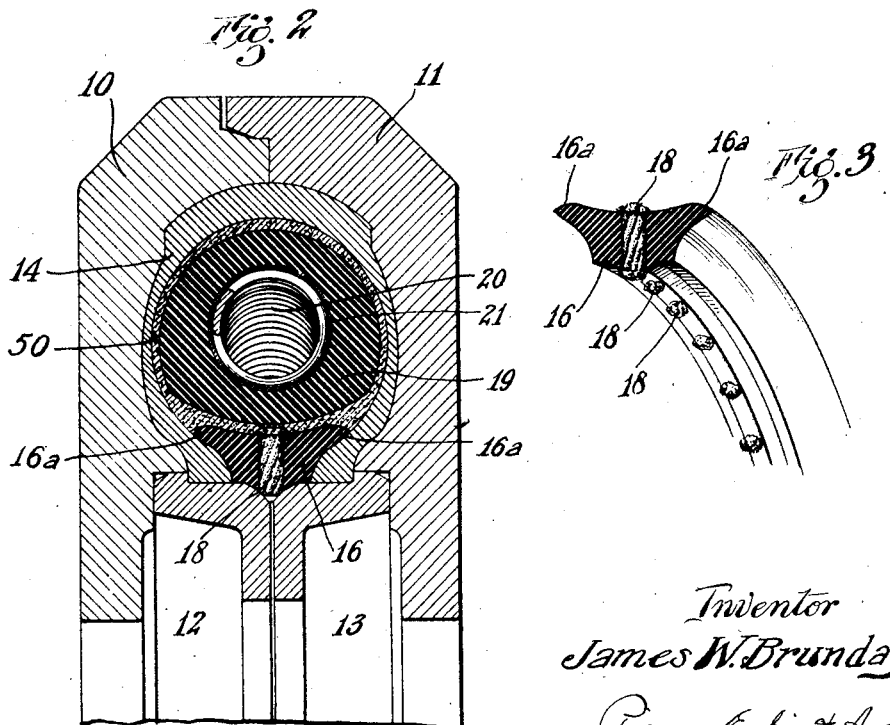
Inventor  
James W. Brundage  
By Pierson, Rakin & Avery  
Attys Patented Aug. 28, 1928.

1,681,973

UNITED STATES PATENT OFFICE.

JAMES W. BRUNDAGE, OF AKRON, OHIO, ASSIGNOR TO THE B. F. GOODRICH COMPANY, OF NEW YORK, N. Y., A CORPORATION OF NEW YORK.

METHOD AND APPARATUS FOR VULCANIZING PNEUMATIC TIRES.

Application filed July 25, 1927. Serial No. 208,147.

This invention relates to the art of vulcanizing pneumatic tires and especially to procedure and apparatus wherein the tire is expanded against a mold by forcing a moist, plastic material into the tire in direct contact with the inner surface thereof while the tire is sufficiently cool to be impermeable to the plastic and in which the plastic is then so stiffened by ridding it of a part of its moisture content that it will serve as a mechanical support against retraction of the inner plies of the tire, being so stiffened as not to penetrate them, when the tire has been softened by the vulcanizing heat.
Heretofore the moisture has been forced into a hollow core lying within the tire cavity, through permeable members mounted in the wall of the core, by the compacting effect of the injection pressure upon the plastic, which has made it desirable to rid the permeable core of moisture, preferably after each vulcanizing operation, and has called for a core of comparatively expensive construction.
My chief objects are to obviate the necessity of drying out a permeable core, to provide for venting the moisture from the plastic to a region of low pressure, and to provide for economy of apparatus. More detailed objects will be manifest.

Of the accompanying drawings:

Fig. 1 is a plan view, with parts sectioned and broken away, of apparatus embodying and adapted to carry out my invention in its preferred form.

Fig. 2 is a section of the same on line 2—2 of Fig. 1.

Fig. 3 is a perspective view of a portion of a bead-closing ring constituting a part of the apparatus.

Referring to the drawings, the apparatus in the preferred form here shown comprises sections 10, 11 of a tire mold and bead-clamping rings 12, 13 for association therewith, all of which may be of known construction.

The tire is shown at 14 and for closing the space between the beads thereof against the escape of plastic material forced into the tire, while permitting moisture to be squeezed from the plastic material by the injecting pressure thereon, I provide a bead-closing ring or "bull-ring" 16 provided with an inlet stem 17 for the plastic and provided at numerous positions about its circumference with porous plugs 18, 18 mounted in respective radially disposed through apertures formed in the ring. The plastic material is shown at 50, and preferably consists of a mixture of about 40 to 50 parts by weight of water to 100 parts of potter's clay such as that commercially known as Atlas ball clay.

The porous plugs may be of any suitable material but preferably are of porous metal, which is now well known in other uses. Alternatively they may be of vegetable or other fiber in the form of wicking, or each plug may consist of a roll of wire-mesh screen.

The construction is such, as shown, that the plugs as well as the ring rest directly upon the bead-clamping rings 12, 13 so that they are not pushed out of their apertures by the force of the plastic within the tire.

The bead-closing ring 16 is preferably formed of soft rubber and with longitudinally disposed, laterally projecting wing or sealing-flange portions 16ª, 16ª adapted to seal in the manner of a lip gasket against the inner surfaces of the respective sidewalls of the tire to prevent the escape of plastic, the soft and flexible character of the ring resulting in the force of the plastic being so uniformly applied to the tire, both directly and through the medium of the soft ring, as to expand the tire without the formation thereon of an objectionable ridge or shoulder along the margin of the ring.

To reduce the amount of plastic material necessary to be used in expanding the tire I preferably employ a filler structure or core member of such size and shape as almost completely to occupy the space enclosed by the tire and the bead-closing ring, and such filler structure may be impervious to the moisture of the plastic, since the porous plugs 18 afford sufficient vents for the moisture, but my invention is not wholly limited to the use of an impervious or to the use of any filler member.

I preferably employ a filler structure or member of such sectional or of such stretchable character that it may be forced radially outward from the bead-closing ring by the injection of plastic material between the two, so that high pressure, in the plastic initially flowing into the space between the tire and the outer periphery of the filler structure, may be developed by outward movement of the filler structure under the force of the plastic against its inner periphery, as distinguished from the building up of such pressure in the outer region of the tire cavity solely by flow of plastic through a thin space defined by an inextensible filler structure and the tire.

Various types of filler structure may be employed. The one here shown is of a unitary character, in the form of an endless ring 19 of elastic rubber, which for the sake of lightness and resilience may be molded in hollow form upon an endless hollow core structure comprising a helical spring 20 and a layer of bias rubberized fabric 21 thereon.

In the operation of the apparatus the tire, which may be built either upon a building core or by the "flat band" method, is assembled with the parts of the apparatus as shown in Figs. 1 and 2 and a number of the mold assemblies are stacked in a tire vulcanizer of the vertical heater-press type.

By means of suitable connections (not shown) which may be similar to the manifolds commonly employed for injecting air or water into expansible cores in similar assemblies, the plastic material is forced under high pressure into the several tires through the inlet stems 17 of the respective mold assemblies, which causes the tires to expand and fill the respective molds. The mold sections 10, 11 are preferably hot from a previous vulcanizing operation when the tire is mounted therein, so that they will quickly soften the tread rubber of the tire and thus permit it to take the form of the mold while the inner plies are still cool and impervious to the plastic, and the plastic is held under high pressure, preferably about 200 pounds to the square inch at the inlet stem 17, for a time prior to introduction of steam into the heater, so that moisture will be forced from the compressed plastic, through the porous plugs 18 and through the space provided by imperfect fit of the bead clamping rings 12, 13, into the space surrounded by the stack of mold assemblies.

As soon as the moisture content of the plastic has been sufficiently reduced to stiffen it to a condition such that it will afford an adequate mechanical support for the expanded tire the steam is turned into the vulcanizer and the tires are vulcanized, the follow-up injection pressure upon the plastic permissibly being discontinued.

When the vulcanization is completed the steam supply to the vulcanizer is turned off and the steam is vented from the vulcanizer, whereupon residual heat in the mold assemblies causes moisture still remaining in the initially plastic distending material to flow therefrom through the porous plugs 18 in the form of steam, which further dries the distending material so that it will readily flake from the filler structure and from the tire upon the removal of the tire from the apparatus, which is then effected. The solidified distending material in then again mixed with water for re-use.

The invention as described provides the advantages set out in the above statement of objects and is susceptible of modification within the scope of the appended claims.

I claim:

1. The method of vulcanizing a pneumatic tire which comprises distending the tire in a mold by forcing a moist, plastic distending material into the tire, reducing the plasticity of the distending material by removal of moisture therefrom through the space between the beads of the tire, and thereafter maintaining the tire at a vulcanizing temperature.

2. A method as defined in claim 1 in which the pressure of fluid external to the tire and in communication with the initially plastic material, through the space between the beads, is kept comparatively low until moisture has been removed from the material as defined and is then increased.

3. The method of vulcanizing a pneumatic tire which comprises distending the tire in a mold through the medium of a mass of plastic material and a filler structure embedded in and forced to move with the plastic mass and heating the distended tire in the mold.

4. Tire-vulcanizing apparatus comprising a tire mold, a bead-closing ring, porous vent members in the ring, and means for conducting a flowable material into a tire mounted in the mold.

5. Tire-vulcanizing apparatus comprising a tire mold, a filler structure adapted to lie within a tire mounted in the mold, means for maintaining the space between the beads of the tire substantially closed against the outward flow of plastic material from the interior of the tire while permitting the escape of moisture therefrom, a mass of moist plastic material, and means for conducting the said mass under pressure into the tire.

6. Apparatus as defined in claim 5 in which the filler structure is so constructed and arranged that it may move outward from the inner periphery of the tire under the force of plastic material conducted into the tire at the inner periphery of the latter.

7. Apparatus as defined in claim 5 in which the filler structure is substantially impervious.

In witness whereof I have hereunto set my hand this 22nd day of July, 1927.

JAMES W. BRUNDAGE.